Aug. 7, 1951      L. J. LADER      2,562,925
SWEEP GENERATOR
Filed Jan. 15, 1946      2 Sheets-Sheet 1
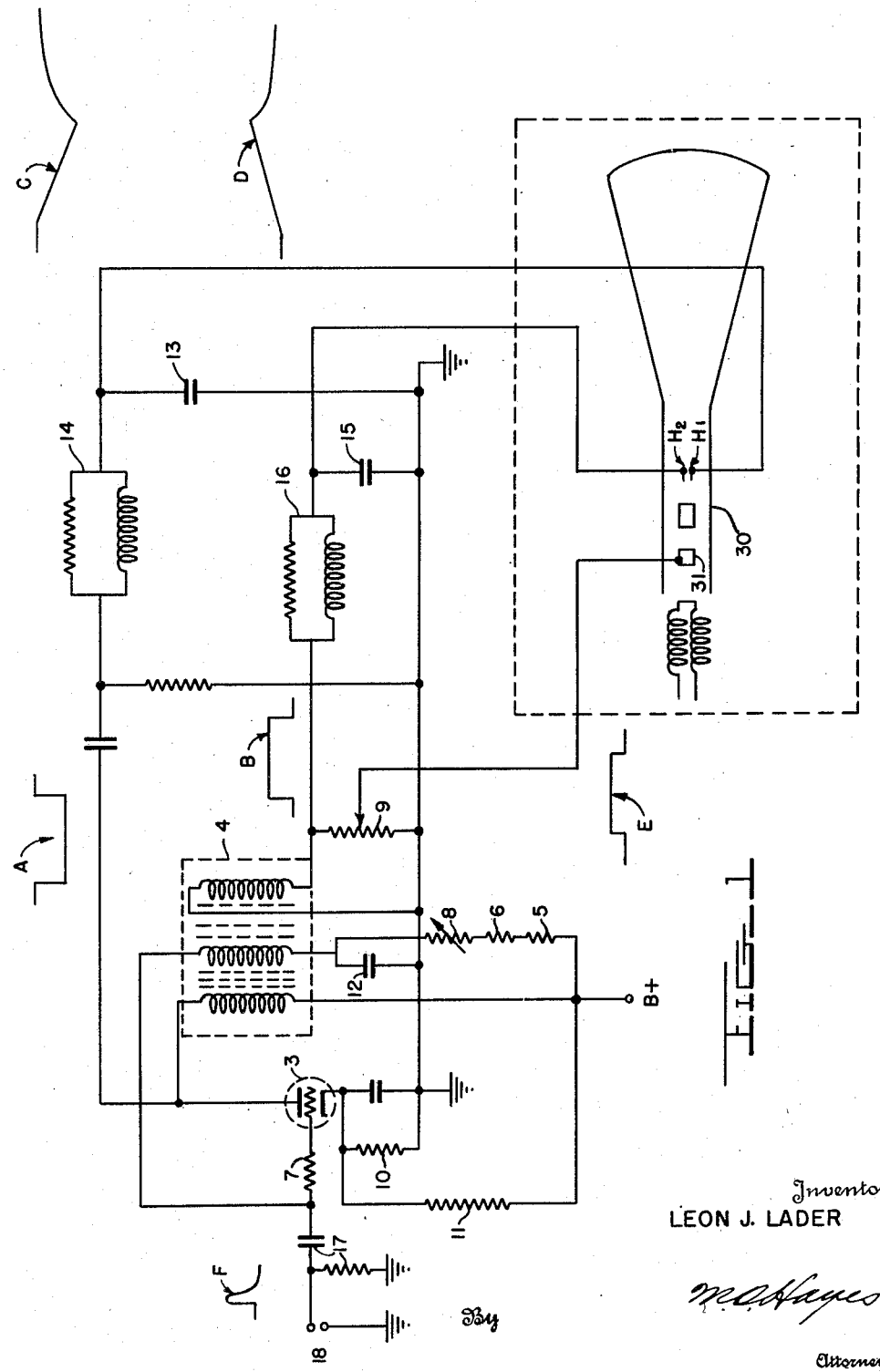
Inventor
LEON J. LADER

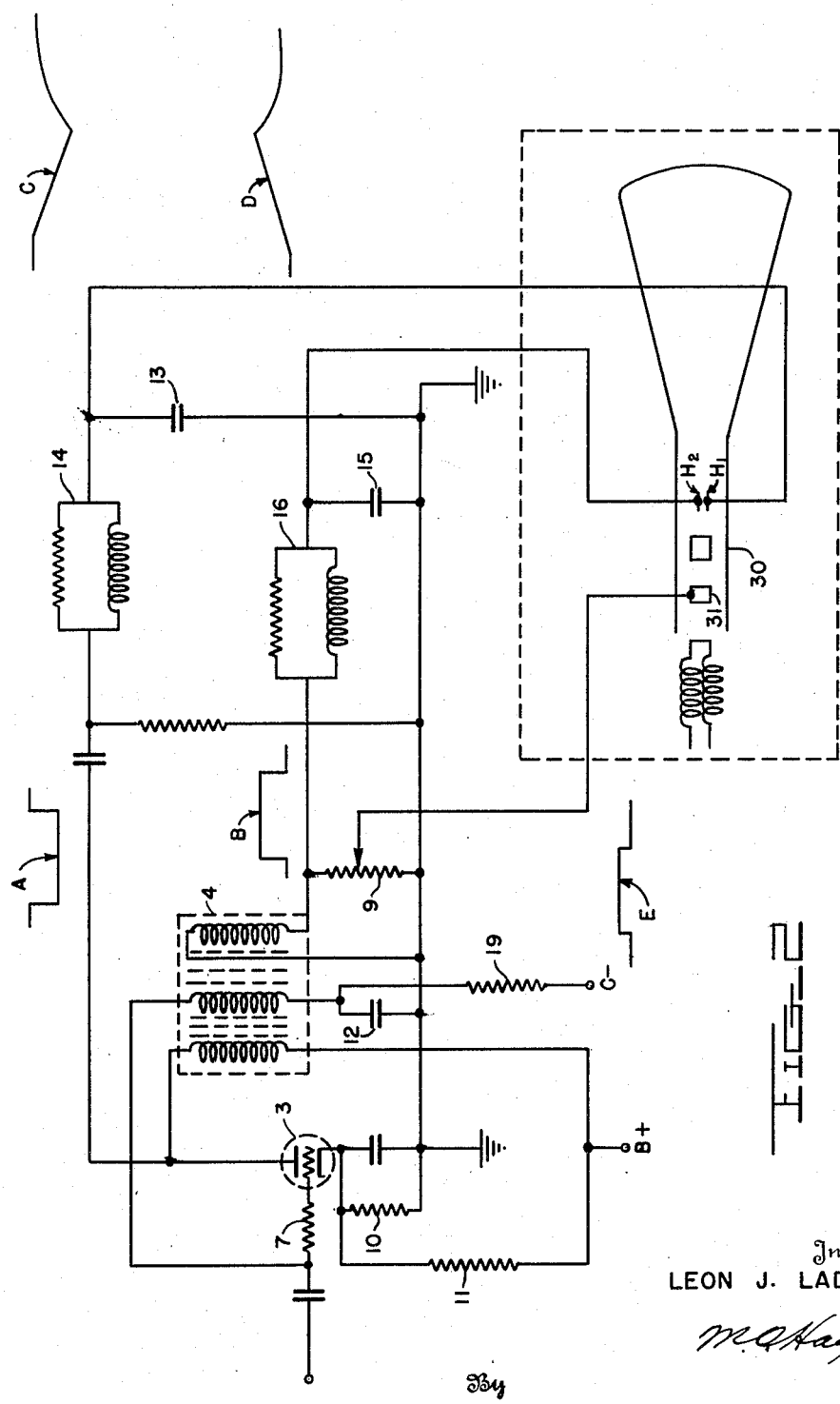

Patented Aug. 7, 1951

2,562,925

UNITED STATES PATENT OFFICE 2,562,925

SWEEP GENERATOR

Leon J. Lader, Washington, D. C.

Application January 15, 1946, Serial No. 641,370

4 Claims. (Cl. 250—36)

(Granted under the act of March 3, 1883, as amended April 30, 1928; 370 O. G. 757)

This invention relates in general to a time base generator and particularly to a cathode ray tube sweep generator.

It is an object of this invention to provide a cathode ray tube sweep generator, comprising but a single vacuum tube element.

It is another object of this invention to provide a cathode ray tube sweep generator which is arranged to produce a push-pull sweep deflection signal and which comprises but a single vacuum tube element.

It is another object of this invention to provide a self-running signal generator for synchronously producing a pair of impulse waveforms and a pair of sense opposed linear voltage sweep waveforms.

Fig. 1 is a detailed circuit diagram of one embodiment of the invention.

Fig. 2 is a detailed circuit diagram of a variant embodiment of the invention.

Briefly stated, my invention comprises a vacuum tube, a transformer having at least two windings associated therewith and a charging capacitor. The windings of the transformer are so connected to the vacuum tube as to form a blocking oscillator. The charging capacitor is connected, in such a manner, to one of the windings of the transformer through a parallel resistor-inductor circuit as to produce a linear rising waveform across the capacitor when the blocking oscillator is actuated. As hereinafter described in detail, the signal developed across the charging capacitor which is applied to the deflecting plates of the cathode ray tube is not vertically abrupt at its trailing edge but contains a definite slope. For optimum performance of the circuit only the linear leading edge of the sweep should appear on the cathode ray tube. This condition is achieved by means of an intensifier wave obtained from the blocking oscillator and applied to the intensifier grid of the cathode ray tube. This intensifier wave is of such a duration and magnitude as to render that part of the electron beam sweep produced by the leading edge of the signal developed across the charging capacitor visible on the tube; the remaining portion of the signal developed across the charging capacitor is blanked and does not therefore appear on the cathode ray tube at all.

The operation of the device can be better understood by reference to Fig. 1. A vacuum tube 3 having an anode, a grid, and a cathode, is so connected with transformer 4 as to be a blocking oscillator. To this end a high potential B+ is applied to the anode through one winding of the transformer. The cathode potential is held close to ground by resistors 10 and 11. A high potential is applied to the grid through another winding of the transformer and resistors 5, 6, 7 and 8 which causes the blocking oscillator to be self-triggering. A third winding, identical with the anode winding but reversed in phase, is connected to ground on one side and to ground through potentiometer 9 on the other side. A resistor 7, inserted in the grid circuit of tube 3, is used to cause grid limiting and levelling of the blocking oscillator pulse. The width of the pulse generated by the blocking oscillator depends primarily on the inductance of transformer 4 and the loading capacities of the vacuum tube and circuit. The repetition rate of the blocking oscillator can be controlled by a variable resistor 8 and capacitor 12.

To understand the production of the square wave, first assume that the grid potential is below cut-off, i. e., capacitor 12 has a negative charge. Thus there will be no grid current and no plate current. The grid potential, however, will rise toward B+ as the capacitor 12 discharges. When the grid potential reaches cut-off value the plate will start to conduct and the plate potential will decrease accordingly. Hence current will start to flow in the plate winding owing to the resulting change in potential across it. This current through the plate winding will cause a magnetic field to develop in the transformer. As this magnetic field develops it will exert a force on the grid winding to produce a difference of potential across the winding such that the potential on the grid will become still more positive. This in turn will cause still more plate current to flow, therefore increasing the current through the plate winding. This change in current and the accompanying change in the magnetic field will act on the grid winding to make the potential on the grid even more positive. Hence a regenerative action is developed which causes the grid potential to become so positive that the grid will conduct. Current therefore will flow from B+ and capacitor 12 through the grid winding and the grid to the cathode and ground. The voltage division from B+ through the grid winding and the grid to the cathode and ground is such that the potential on the top of the capacitor 12 will begin to become more negative, i. e., the capacitor will begin to charge. The grid potential, however, will remain above the cathode potential because of the potential difference on the grid winding. The regenerative effect continues until saturation of the vacuum tube occurs. The action just described is almost instantaneous and results in the sharp front of the square wave. When the vacuum tube becomes saturated the current through the plate winding will cease to change. Hence the magnetic field will become static. As a result of the fact that it will no longer be subjected to a changing magnetic field a difference of potential will cease to be induced across the grid winding. With no potential difference the current would tend to stop, but, owing to the inductive quality of the winding, and to the loading capacities of the vacuum tube, the current and therefore the potential will not disappear immediately. Hence the grid potential will remain slightly above the cathode potential for a short period of time, which time depends on the parameters, namely inductance, of the transformer and the value of the loading capacities of the vacuum tube and circuit. The length of this period determines the time duration of the square wave. The potential on the anode during this time will remain at a steady low value. This same potential appears, of course, at the top of the plate winding and forms the outline of the square wave shown in oscillogram A. At the same time that waveform A is being generated at the anode of the tube waveform B, opposite in polarity, is being generated across the potentiometer 9 connected to the tertiary winding of the transformer 4. The current through and potential across the grid winding, while they will continue high for a short time as before stated, will, nevertheless, start to drop off rather rapidly after the fashion of the decline of current in an inductor when a driving potential is removed. The difference in potential across the grid winding will soon become so low that, owing to the negative charge on capacitor 12, the grid potential will lower to a point where the current through the vacuum tube will be reduced. Therefore the current through the plate winding will start to drop and the regenerative action will soon cause the grid potential to drop to cut-off. This regenerative action, like the previous one, is almost instantaneous and produces the sharp end of the square wave A. Since it is connected to B+, the potential on capacitor 12 will start to rise again and when its value reaches cut-off the cycle repeats. The time required for the cut-off potential to be reached depends on the time constants comprising capacitor 12 and resistors 5, 6 and 8 and can be varied by adjustment of the variable resistor 8.

The blocking oscillator square wave as it appears at the anode winding is applied to a charging capacitor 13 through a parallel resistor-inductor network 14 to produce constant current charging and a negative linear sweep C. The voltage waveform thus produced represents one half of a push-pull beam deflection signal and is applied to one of the horizontal deflection plates H1 of the cathode ray tube 30.

The blocking oscillator square wave as it appears on the third winding is applied to a second charging capacitor 15 through a second parallel resistor inductor network 16 to produce constant current charging and a positive linear sweep D. The voltage waveform thus produced across the capacitor 15 represents the second half of a push-pull beam deflection signal and is applied to the second horizontal deflection plate H2 of the cathode ray tube 30. Since capacitors 13 and 15 are not provided with rapid discharging means the voltage waveforms appearing there across will not be terminated abruptly but will contain a sloping trailing edge. To remove the effect of these trailing edges upon the generation of the electron beam trace on the cathode ray tube 30 a positive intensifier signal is obtained from across potentiometer 9 and applied to the intensifier grid 31 of the cathode ray tube. The intensifier wave E is identical to waveform B and functions so as to render the electron beam trace visible only during the production of the leading edge of the voltage waves appearing across 13 and 15. This potentiometer permits the amplitude of the intensifier wave to be adjusted as desired.

The blocking oscillator wave as it appears on the grid winding is applied to a differentiating circuit (a short time constant circuit) 17 to produce a trigger pulse as shown in waveform F at terminal 18.

It is thus apparent that a negative linear sweep, a positive linear sweep, an intensifier wave and a trigger pulse can all be obtained from one electron discharge device. This combination results in both simplicity of construction and ruggedness of construction.

In the preceding description of Fig. 1 it is to be noted that the blocking oscillator is self-triggering and that a trigger pulse is produced. With this arrangement it is possible to synchronize at the repetition rate of the blocking oscillator a device which is to be tested with the time base generator.

Instances might occur, however, when it would be more desirable to have the blocking oscillator pulse in synchronization either with the device to be tested or with some other pulsing device. By returning the grid to a potential C− lower than the cut-off potential rather than to B+ this facility can be provided. Fig. 2 shows the invention in this form. The formation of the square wave remains the same but the blocking oscillator is no longer self-triggering. In the stable state the grid is held at a low enough potential by a connection through resistor 19 to C− that the vacuum tube is non-conducting. It is necessary to apply to the grid a triggering pulse of sufficient amplitude to cause the electron discharge device to conduct. Once current starts to flow the aforementioned regenerative actions take place to produce the square wave. The grid potential then tends to return to and stay at C− until it is again driven above cut-off by the next triggering pulse.

It will be understood that the embodiments shown are exemplary only of the invention, and that the scope thereof will be ascertained with reference to the appended claims.

The invention described herein may be manufactured and used by or for the Government of the United States of America for governmental purposes without the payment of any royalties thereon or therefor.

What is claimed is:

1. A cathode ray tube sweep generator comprising, a square wave pulse generator including a single electron discharge device having at least an anode, a grid, and a cathode, a pulse forming transformer having at least two windings, a source of direct current operating potential for said discharge device, means including one of said transformer windings connecting the anode of said electron discharge device to said source of potential, means including the other of said windings regeneratively connecting the grid of said electron discharge device to said potential source to render said discharge device conductive and to impress a bias potential on said grid in response to increasing current in said anode circuit, said last named means further including a capacitance and a series of resistors for rendering said discharge device nonconductive a predetermined time after initiation of conduction therein, and output channel means connected in shunt with the anode cathode path of said discharge device comprising a charging capacitor across which an output wave may be obtained and a parallel inductor resistor network serially connected with said charging capacitor.

2. A cathode ray tube sweep generator comprising, a square wave pulse generator including a single electron discharge device having at least an anode, a grid, and a cathode, a pulse forming transformer having at least three windings, a source of direct current operating potential for said discharge device, means including one of said transformer windings connecting the anode of said electron discharge device to said source of potential, means including another of said windings regeneratively connecting the grid of said electron discharge device to said potential source to render said discharge device conductive and to impress a bias potential on said grid in response to increasing current in said anode circuit, said last named means further including a capacitance and a series of resistors for rendering said discharge device nonconductive a predetermined time after initiation of conduction therein, and output channel means connected across the third of said transformer windings comprising a charging capacitor across which an output wave may be obtained and a parallel inductor resistor network serially connected with said charging capacitor.

3. A cathode ray tube sweep generator comprising, a square wave pulse generator including a single electron discharge device having at least an anode, a grid, and a cathode, a pulse forming transformer having at least three windings, a source of direct current operating potential for said discharge device, means including one of said transformer windings connecting the anode of said electron discharge device to said source of potential, means including another of said windings regeneratively connecting the grid of said electron discharge device to said potential source to render said discharge device conductive and to impress a bias potential on said grid in response to increasing current in said anode circuit, said last named means further including a capacitance and a series of resistors for rendering said discharge device nonconductive a predetermined time after initiation of conduction therein, first output channel means connected in shunt with the anode-cathode path of said discharge device comprising a first charging capacitor across which an output wave may be obtained and a parallel inductor resistor network serially connected with said charging capacitor, a second output channel means connected across the third winding of said transformer comprising a second charging capacitor across which an output wave may be obtained and a second parallel inductor resistor network serially connected with said second charging capacitor.

4. A cathode ray tube sweep generator comprising, a square wave pulse generator including a single electron discharge device having at least an anode, a grid, and a cathode, a pulse forming transformer having at least three windings, a source of direct current operating potential for said discharge device, means including one of said transformer windings connecting the anode of said electron discharge device to said source of potential, means including another of said windings regeneratively connecting the grid of said electron discharge device to said potential source to render said discharge device conductive and to impress a bias potential on said grid in response to increasing current in said anode circuit, said last named means further including a capacitance and a series of resistors for rendering said discharge device nonconductive a predetermined time after initiation of conduction therein, first output channel means connected in shunt to the anode cathode path of said discharge device comprising a first charging capacitor across which an output wave may be obtained and a parallel inductor resistor network serially connected with said charging capacitor, a second output channel means connected across the third of said transformer winding comprising a second charging capacitor across which a second output wave may be obtained and a second parallel inductor resistor network serially connected with said second charging capacitor, and a differentiating resistor-capacitor circuit connecting to said grid winding.

LEON J. LADER.

REFERENCES CITED

The following references are of record in the file of this patent:

UNITED STATES PATENTS

| Number | Name | Date |
|---|---|---|
| 2,125,732 | Bowman-Manifold et al. | Aug. 2, 1938 |
| 2,233,596 | Faudell | Mar. 4, 1941 |
| 2,265,620 | Bahring | Dec. 9, 1941 |
| 2,303,924 | Faudell | Dec. 1, 1942 |
| 2,308,908 | Bahring | Jan. 19, 1943 |
| 2,320,551 | Bahring | June 1, 1943 |
| 2,412,210 | Edson et al. | Dec. 10, 1946 |
| 2,413,063 | Miller | Dec. 24, 1946 |
| 2,444,782 | Lord | July 6, 1948 |

FOREIGN PATENTS

| Number | Country | Date |
|---|---|---|
| 235,254 | Great Britain | June 11, 1925 |